United States Patent
Boelkins et al.

(10) Patent No.: US 11,559,866 B2
(45) Date of Patent: Jan. 24, 2023

(54) MINIMUM QUANTITY LUBRICATION SYSTEM AND METHOD

(71) Applicant: Unist, Inc., Grand Rapids, MI (US)

(72) Inventors: Charles W. Boelkins, Grand Rapids, MI (US); Michael T. Veurink, Grand Rapids, MI (US); Timothy J. Bangma, Grand Rapids, MI (US); Timothy L. Walker, Grand Rapids, MI (US)

(73) Assignee: Unist, Inc., Grand Rapids, MI (US)

( * ) Notice: Subject to any disclaimer, the term of this patent is extended or adjusted under 35 U.S.C. 154(b) by 131 days.

(21) Appl. No.: 16/528,943

(22) Filed: Aug. 1, 2019

(65) Prior Publication Data

US 2020/0039016 A1 Feb. 6, 2020

Related U.S. Application Data

(60) Provisional application No. 62/713,806, filed on Aug. 2, 2018.

(51) Int. Cl.
*B23Q 11/10* (2006.01)
*F16N 7/32* (2006.01)
*F16N 13/22* (2006.01)

(52) U.S. Cl.
CPC ............ *B23Q 11/1046* (2013.01); *F16N 7/32* (2013.01); *F16N 13/22* (2013.01); *B23B 2250/12* (2013.01); *F16N 2270/72* (2013.01)

(58) Field of Classification Search
CPC ... B23Q 11/1046; B23Q 11/1038; F16N 7/32; F16N 13/22
See application file for complete search history.

(56) References Cited

U.S. PATENT DOCUMENTS

| 2,328,812 A | 9/1943 | Klein |
| 3,062,454 A | 11/1962 | Cocks |

(Continued)

FOREIGN PATENT DOCUMENTS

| CN | 102840435 | 12/2012 |
| DE | 10132857 | 1/2003 |

(Continued)

OTHER PUBLICATIONS

International Search Report and Written Opinion of the International Searching Authority from corresponding Patent Cooperation Treaty (PCT) Patent Application No. PCT/IB19/56583, dated Dec. 19, 2019.

(Continued)

*Primary Examiner* — Michael R Mansen
*Assistant Examiner* — Mark K Buse
(74) *Attorney, Agent, or Firm* — Gardner, Linn, Burkhart & Ondersma LLP

(57) ABSTRACT

A minimum quantity lubrication (MQL) system includes a controller, a lubricant module coupled to a tool spindle of a machining apparatus, and a pneumatic module coupled to the spindle. The lubricant module is configured to supply lubricant at pressure to the tool, as controlled by the controller. Likewise, the pneumatic module is configured to supply pressurized air to the tool, as controlled by the controller. The controller is configured to direct the lubricant module to supply lubricant prior to the controller receiving a START signal from a machine tool controller. Optionally, the lubricant pressure level is predetermined based on known characteristics of the tool that is coupled to the spindle. Optionally, the START signal is anticipated by referring to a signature/profile of the operational steps of a machining process where a timeline or time table of lubrication request intervals are identified.

12 Claims, 3 Drawing Sheets

(56) References Cited

U.S. PATENT DOCUMENTS

| | | | |
|---|---|---|---|
| 3,618,709 A | | 11/1971 | Boelkins |
| 3,888,420 A | | 6/1975 | Boelkins |
| 4,205,708 A | | 6/1980 | Burgbacher |
| 4,284,174 A | | 8/1981 | Salvana et al. |
| 4,312,424 A | | 1/1982 | Taylor et al. |
| 4,494,676 A | | 1/1985 | Berwegre |
| 4,527,661 A | | 7/1985 | Johnstone et al. |
| 4,687,138 A | | 8/1987 | Ostergaard |
| 4,852,693 A | | 8/1989 | Nakajima et al. |
| 4,858,645 A | | 8/1989 | Reeves |
| 4,946,352 A | | 8/1990 | Evenson |
| 5,020,636 A | | 6/1991 | Daeges |
| 5,690,738 A | * | 11/1997 | Boelkins ............... B05C 1/0813 118/227 |
| 5,715,912 A | | 2/1998 | Maxwell et al. |
| 6,567,710 B1 | * | 5/2003 | Boelkins ............... G05B 19/46 137/87.03 |
| 6,840,404 B1 | | 1/2005 | Schultz et al. |
| 7,665,578 B2 | * | 2/2010 | Grozinger .......... B23Q 11/1046 184/55.1 |
| 8,256,388 B2 | | 9/2012 | Aixala |
| 8,934,998 B1 | * | 1/2015 | Boelkins ............ B23Q 11/1046 700/159 |
| 9,616,540 B2 | | 4/2017 | Balaji et al. |
| 9,873,852 B2 | | 1/2018 | Clarens et al. |
| 9,931,724 B2 | * | 4/2018 | Balaji ................ B23Q 17/0952 |
| 10,259,008 B1 | | 4/2019 | Bangma |
| 10,576,596 B2 | | 3/2020 | Bangma et al. |
| 2002/0071771 A1 | | 6/2002 | Miller |
| 2003/0123940 A1 | | 7/2003 | Hubbard |
| 2003/0159889 A1 | | 8/2003 | Johnson et al. |
| 2005/0241882 A1 | * | 11/2005 | Grozinger .......... B23Q 11/1046 184/50.2 |
| 2012/0015587 A1 | * | 1/2012 | Leishman ................ B24B 1/00 451/7 |
| 2012/0031705 A1 | | 2/2012 | Divisi |
| 2012/0325321 A1 | * | 12/2012 | Perry ................ B23Q 11/1023 137/1 |
| 2015/0330564 A1 | | 11/2015 | Mueller et al. |
| 2016/0158784 A1 | | 6/2016 | Fehr |
| 2017/0066096 A1 | * | 3/2017 | Boelkins ................ G05B 19/00 |
| 2017/0066097 A1 | * | 3/2017 | Bangma ................ B05B 7/0458 |
| 2017/0113315 A1 | * | 4/2017 | Bangma ................... F16N 7/32 |
| 2019/0275627 A1 | * | 9/2019 | Wang ................ B23Q 17/0961 |
| 2019/0275628 A1 | * | 9/2019 | Hwang ............... F16H 57/0497 |

FOREIGN PATENT DOCUMENTS

| | | |
|---|---|---|
| DE | 10345130 | 4/2005 |
| DE | 102006030651 | 1/2007 |
| DE | 10238203 | 6/2010 |
| DE | 102015005634 | 8/2015 |
| EP | 2416052 | 2/2012 |
| EP | 3163147 | 5/2017 |
| WO | 99/15298 | 4/1999 |

OTHER PUBLICATIONS

European Search Report and Written Opinion from corresponding EP Application No. 19845270.8, dated Mar. 24, 2022.

* cited by examiner

MINIMUM QUANTITY LUBRICATION SYSTEM AND METHOD

CROSS REFERENCE TO RELATED APPLICATION

The present application claims the benefit of U.S. provisional application Ser. No. 62/713,806, filed Aug. 2, 2018, which is hereby incorporated by reference in its entirety.

FIELD OF THE INVENTION

The present invention is directed to lubrication delivery systems, such as minimum quantity lubrication (MQL) systems, and in particular, to reducing lubrication delivery response times in MQL systems.

BACKGROUND OF THE INVENTION

Minimum Quantity Lubrication (MQL) systems can be used to deliver lubricant through a cutting tool in a CNC machine. Such MQL systems measure and track the quantity of lubricant being applied to the cutting region, as well as ensure that the lubricant is being applied in a continuous or near-continuous manner during cutting. Such tracking and lubricant delivery goals are made complicated in MQL systems that deliver lubricant to tools through the machine spindle because such systems have a wide potential range of lubricant flow rates, e.g., 1 to 500 ml/hr., and are required to deliver this liquid accurately and quickly against a varying backpressure, e.g., up to 10 bar. Such MQL systems also operate under conditions where flow is repeatedly turned ON and OFF, and where different tools are switched out, resulting in frequent pausing of lubricant delivery.

SUMMARY OF THE INVENTION

Embodiments of the present invention provide for a minimum quantity lubrication (MQL) system that combines small quantities of lubricant with a high-pressure gas flow at a sufficient rate to create an atomized lubricating mixture, i.e., an aerosol that is applied at the interface between a cutting tool and a workpiece. The MQL system is configured to reduce a response time for lubricant to be delivered to the tip of a cutting tool when a lubrication START signal is received.

An MQL system in accordance with the present invention includes a lubricant delivery system and a gas delivery system. The lubricant delivery system includes a lubricant delivery conduit to a mixing chamber. The gas delivery system includes a gas delivery conduit to the mixing chamber. The mixing chamber may be in the machine-tool spindle, the tool holder, or a specialized insert within these. A first valve positioned between the lubricant delivery system and the mixing chamber maintains a lubricant pressure in the lubricant delivery line when the MQL system is paused. A second valve positioned between the gas delivery system and the mixing chamber maintains a gas pressure in the gas delivery line when the MQL system is paused. The first and second valves are closed when the MQL system is paused, and the valves are opened when the MQL system is activated.

Another MQL system of the present invention includes a controller, a lubricant module, and a pneumatic module. The lubricant module and the pneumatic module are coupled to a spindle of a machining tool. A tool is coupled to the spindle. The lubricant module is configured to supply lubricant at a preset flow rate to the tool, as controlled by the controller. The pneumatic module is configured to supply pressurized air to the tool, as controlled by the controller. The controller is configured to receive a START signal from a machine tool controller. The controller is further configured to select a lubricant flow rate for the lubricant module before receiving the START signal.

In a method for reducing the response time of a minimum quantity lubrication (MQL) system in accordance with the present invention, the method includes supplying, with a lubricant module of an MQL system, a lubricant at a preset pressure to a machining tool coupled to a spindle. A pneumatic module is used to supply pressurized air to the tool. A START signal is received from a machine tool controller. A lubricant flow rate is selected for the lubricant module, either directly or indirectly through a look-up table, before receiving the START signal, as defined by the controller. A lubricant pressure level is defined by the selected lubricant flow rate and the backpressure present in the spindle.

In one aspect of the present invention, an anticipated backpressure changes when a first tool is replaced with a second tool (with a different resultant backpressure). The anticipated backpressure change is used to change the lubricant pressure while the MQL system is paused during the tool change. The lubricant pressure is changed to a pressure such that the lubricant in the liquid delivery line flows at the selected flow rate against the backpressure when the first and second valves are opened.

In a further aspect of the present invention, the tool is coupled to the spindle via a tool holder, such that the tool holder is coupled to the spindle and the tool is coupled to the tool holder. An MQL aerosol supplied to the tool is therefore produced in the tool holder and passed through the tool.

In another aspect of the present invention, the MQL system is paused when a STOP signal is received from a CNC machine, and is restarted when a START signal is received from the CNC machine.

In yet another aspect of the present invention, the MQL system's lubricant module may be configured as either a volumetric MQL system or a flow-metered MQL system.

In one embodiment of the present invention, the response time increase caused by the physical pushback of the lubricant in a lubricant delivery conduit by the gas back pressure is overcome by opening the first valve a selected time interval before receiving the START signal.

In a further aspect of the present invention, the first valve is opened at the selected time interval by activating the lubricant module before the START signal is received by the MQL system. Optionally, the lubricant module is activated before receiving the START signal by receiving a second signal from the CNC machine. In another aspect of the present invention, the lubricant module is activated before receiving the START signal through the use of pre-established "signatures" or "profiles" of different CNC machine processes, each " " signature or profile defined by the operations of the particular machining process. Such a signature/profile may comprise a timeline or time table of one or more periods of time during a particular machining process that includes one or more periods of time when the lubricant module is directed to provide lubricant, so that the lubricant module may be directed to activate even prior to a lubrication START signal from a CNC machine.

Accordingly, embodiments of the present invention provide for an MQL system with reduced response time between when a lubrication START signal is received and when lubricant is delivered to the tip of a cutting tool. For example, the response time may be reduced by compensating for changing backpressure according to the specific tool selected and how that specific tool is to be used for a particular machining operation, as well as by more rapidly overcoming physical pushback of the lubricant by gas pressure (backpressure) by anticipating the sending of the START signal and starting the lubricant delivery process early, prior to the actual START signal.

These and other objects, advantages, purposes and features of the present invention will become apparent upon review of the following specification in conjunction with the drawings.

DETAILED DESCRIPTION OF THE PREFERRED EMBODIMENTS

Figure 1:
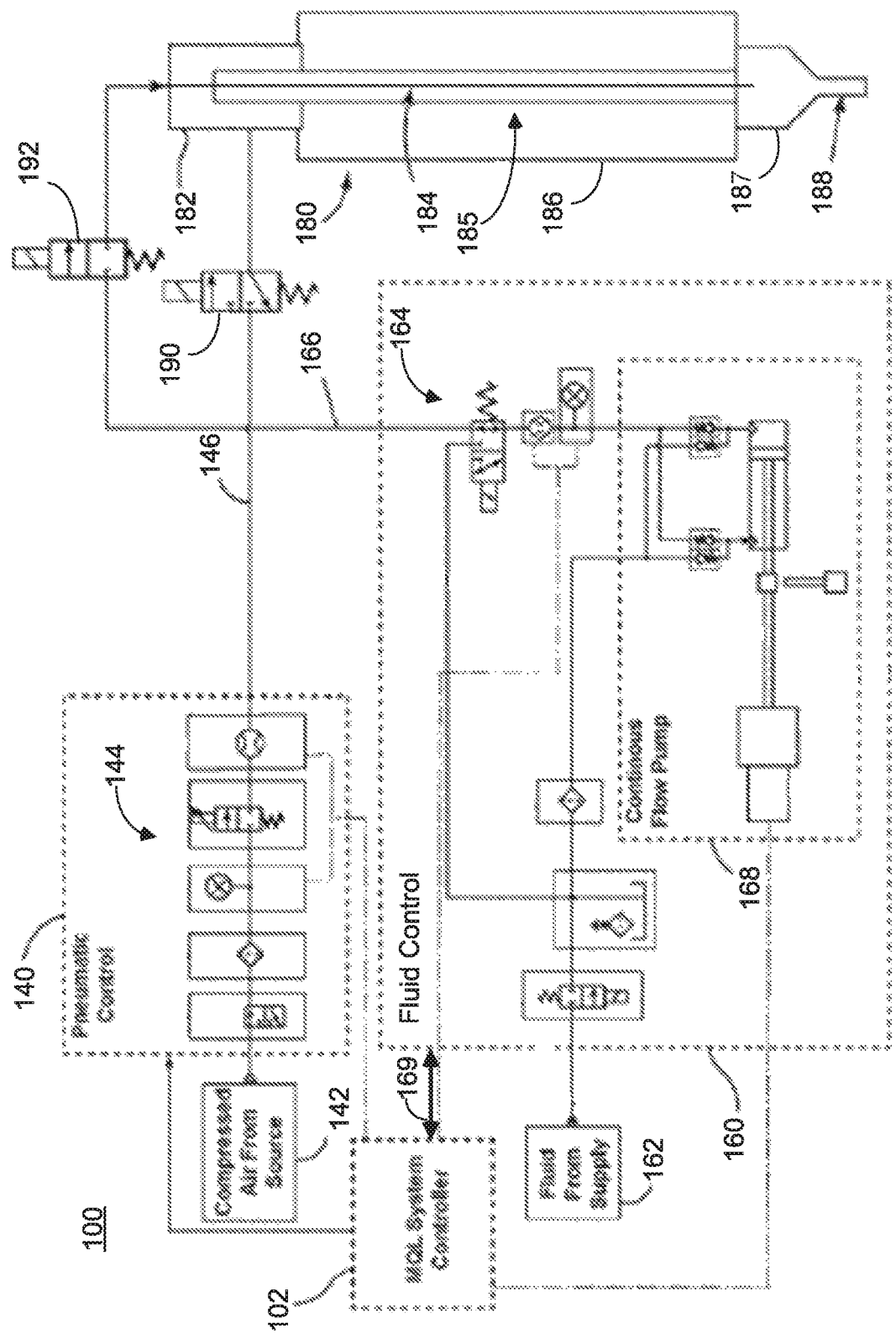
FIG. 1 is a block diagram of an exemplary MQL system coupled to a tool according to an embodiment of the present invention.

Referring now to the drawings and the illustrative embodiments depicted therein, a minimum quantity lubrication (MQL) system, for supplying a lubricant to the cutting interface between a tool and a workpiece through the spindle and tool holder of a computer numerical control machine ("CNC machine"), is provided for reduced response times when lubricant delivery is requested from the CNC machine's control unit. The response time (for lubricant delivery) is the time between when a lubrication START signal is received and when lubricant is delivered to the tip of a cutting tool by the MQL system. Other definitions for a response time are also possible. Exemplary embodiments of an MQL system according to the present invention provide for reduced response times by compensating for changing backpressure according to the specific tool selected and how that specific tool is used for a particular machining operation, as well as by more rapidly overcoming physical pushback of the lubricant in the liquid delivery tube by gas pressure by anticipating the sending of the START signal and starting the lubricant delivery process early, prior to the actual START signal.

By reducing or substantially eliminating response time, the use of lubricant is optimized (minimizing waste) and tool life is maintained by ensuring that lubricant is present at the tool/workpiece interface at the moment the cut is started, even when the lubricant is working against a high backpressure. An optimized delivery of lubricant may also provide for a cleaner machine process environment (i.e., less lubricant to be cleaned up at the machine site). Additionally, the optimized delivery of lubricant may also allow for a cleaner finished work product that would require less clean-up after the machining operation. A short response time is desirable any time the MQL lubricant needs to be present (e.g., during cutting/drilling operations), whether after tool changes or between different operations using the same tool. For example, if the CNC machine is drilling a plurality of holes with the same tool, it is desirable to have short response times during these STOP/START cycles between each drilling operation. An optimal MQL lubricant application process (that anticipates START signals and backpressure changes) provides for a minimized delay in lubrication delivery, as well as providing for a minimized over-spray and under-spray of lubricant. A preferred MQL lubricant application process will provide for no delay in lubrication delivery, as well as providing no over-spray and no under-spray of lubricant.

It will be appreciated that for lubricant liquid to flow out of a liquid conduit, the lubricant pressure must be higher in the liquid conduit than the air or gas pressure (the "backpressure") in the volume or space into which it is flowing. The backpressure is the air pressure present in the air conduit that surrounds the liquid conduit and against which the lubricant must be dispensed. A higher lubricant pressure in the liquid conduit results in a higher lubricant flow rate, while a lower lubricant pressure results in a lower lubricant flow rate. The required pressure differential (i.e., the degree to which the lubricant pressure in the liquid conduit exceeds the backpressure) for a given desired lubricant flow rate can be calculated or determined through testing or operational data collection. Using a positive-displacement pump, the lubricant can be moved at a predetermined or selected flow rate, which results in a lubricant pressure that is higher than the backpressure, causing the liquid lubricant to flow into a mixing chamber and to a tool/workpiece cutting interface. The optimum lubricant pressure associated with a desired flow rate through a given tool can thus be determined.

When an MQL system is turned off, the fluid pressure inside the spindle will drop to atmospheric pressure because the tool is open to atmosphere. This causes the liquid lubricant and any entrapped gases in the liquid conduit, on the tool side of the conduit and downstream of the last pressure valve, to also fall to atmospheric pressure. Any entrained air in the lubricant expands and any elastic elements (such as tubing) in the low pressure region of the liquid conduit contract as the liquid pressure drops. When the MQL system is turned ON, the backpressure again rises to an elevated level, any air or gases entrained in the lubricant again compress, and the elastic elements on the tool side of the liquid conduit, downstream of the last pressure valve, will expand. As a result, the lubricant flows upstream in the liquid conduit, called "pushback."

While the distance of pushback is small, it occurs at the distal end of the liquid conduit where the mixing chamber is located, and any liquid pushback distance can be significant because of the low lubricant flow rates that are typical of MQL systems. Because of the low flow rates of MQL systems, it can take an excessive amount of time for the liquid lubricant to move the pushback distance, after the last valve in the liquid conduit is opened, resulting in excessive time from the lubricant START signal until liquid (including atomized) lubricant arrives at the mixing chamber and/or the tool/workpiece interface.

The backpressure in the MQL system is usually determined at least in part by physical characteristics of the tool used in the machining operation. The individual tool often determines what the air pressure will be, because the passageways in the particular tool are the tightest restrictions in the airflow path. The nature of a given machining operation with a given tool may also affect backpressure. A given backpressure level may also change over time during a given series of machining operations, due to tool changes for different machining operations. Such effects are independent of a tool change. Even if the same tool is used for a same series of machining operations, knowing the backpressure caused by the tool would still be relevant. By knowing in advance what the backpressure will be, regardless of cause, the response time of the MQL system may be reduced by compensating in advance (before the START signal is received) for physical effects that are expected to be present when the START signal is received. Such advanced knowledge may also be beneficial even in situations when the backpressure isn't changing (e.g., changing the lubricant pressure to compensate for a changing lubricant flow rate against a constant backpressure). As discussed herein, the response time may be reduced by pre-adjusting the MQL system lubricant pressure when the backpressure is changing, as well as by more rapidly overcoming the physical pushback of lubricant in a liquid delivery tube by anticipating the sending of the START signal (whether or not there has been a backpressure change).

A first step toward reducing the MQL system response time is obtaining advanced knowledge of what the backpressure in the MQL system will be. With this advanced knowledge of the specific resulting backpressure caused by the tool, the MQL system liquid conduit pressure can be pre-adjusted (before receiving the START signal) to an optimum level that prepares the MQL system lubricant pressure for overcoming the anticipated backpressure (for a given lubricant flow rate). Determining the needed lubricant pressure to overcome the anticipated gas backpressure can be done in several ways. For example, a CNC machine controller can send a signal to the MQL system to indicate to the MQL system that a tool change is in progress and which new tool will be used, an optical or RFID tag on the tool or tool holder can be read, or alternatively, a pressure signature for an overall machining cycle of the CNC machine can be determined and used to allow the MQL system to anticipate the upcoming backpressure change(s). For example, the CNC machining operation may comprise one or more iterations of a series of spindle/tool movements and machining steps (cutting, drilling, etc.) that include one or more tool changes at selected intervals during the machining steps. These tool changes may result in changing backpressure requirements for the associated MQL system. The resultant backpressure changes (due to the selected tool changes), once the tool selections and their associated timing intervals have been selected for the particular machining operation, may be used to create a pressure signature of the changing backpressure requirements of the that machining operation. This pressure signature may then be used to program the MQL system to anticipate any changing backpressure requirements of the associated machining operation.

In a volume-based MQL delivery system, it is desirable to minimize lubricant volume changes caused by lubricant overpressure and to minimize delays caused by lubricant underpressure. As described herein, the volume changes can be due to compression or expansion (e.g., when the pressure increases, any entrained gas bubbles are compressed and the liquid conduits' inside diameters grow larger, increasing the physical volume; and when the pressure decreases, the opposite occurs), which volume changes may be referred to as "system elasticity". This system elasticity results in a delay (by allowing the "pushback" described herein) between when the system receives the START command to start delivering lubricating liquid and when the lubricating liquid begins exiting the liquid delivery tube 184. By correlating a volume flow rate output of a positive displacement pump to a liquid pressure in the liquid supply line, the liquid pressure in the liquid supply line (once the last valve along the liquid supply line has been opened) can be preselected to be sufficiently higher than the anticipated or actual backpressure so as to overcome the backpressure, causing liquid lubricant to flow into the mixing chamber at a desired flow rate. The desired flow rate for a given machining operation can be set directly at a fluid control, or may be set according to a look-up table, for example. In this manner, the MQL system liquid conduit pressure can be pre-set to an "optimum" level, to reduce delays in lubricating liquid arriving at the mixing chamber or the tool/workpiece interface after a predictable time has elapsed from the opening of the final (most downstream) valve in the liquid line, without excessive liquid pressures.

A second part to reducing the MQL system response time is anticipating and compensating for the delay between the MQL systems' receipt of the START signal and the liquid lubricant's arrival at the tool/workpiece interface. The backpressure-induced pushback will be overcome and liquid lubricant (which may be in aerosol form) will arrive at the tool-workpiece interface after an elapsed time has passed from final valve opening, depending upon the liquid lubricant pressure and the gas pressure in the mixing chamber. By anticipating the sending of the START signal by approximately the known delay or lapse time, and opening a pressurized lubricant delivery valve before receiving the actual START signal, the initial tool-to-workpiece engagement is more likely to be adequately lubricated than if the valve is not actuated until the actual START signal is received. Thus, by anticipating the actual START signal and signaling the pressurized lubricant delivery valve to open even before the START signal is received, lubricant can be atomized (turned into an aerosol) in a mixing chamber of a tool holder and exit the tool substantially without delay from the START signal. Therefore, an elapsed time as measured from when the START signal is received to when there is lubricant flow from the end of the liquid delivery tube or lubricant conduit is measurably shorter when the herein-described MQL system and methods are implemented. However, the elapsed time between when the pressurized lubricant delivery valve is opened and when the lubricant is emitted from the tool or liquid delivery tube or lubricant conduit, will be unchanged.

In anticipating and responding to the pending backpressure changes, in an MQL system that controls the lubrication liquid flow volumetrically, knowing the backpressure change in advance allows the response time to be reduced by having the MQL system's pressure preset to the optimum pressure to overcome the anticipated backpressure even before the START signal is received. As described above, different tools exhibit different backpressures when the fluid lines/conduits are pressurized. For an operation using a single tool, each time the tool is paused the MQL system will be shut down and the lubricant and air or gas supplies will be de-pressurized. In these circumstances there will be a pressure change in the MQL system even without a tool change. Thus, in a volumetric MQL system, setting a flow rate corresponding to an optimum pressure, based upon the anticipated backpressure, allows the timing of the lubricant's arrival at a given location to be better optimized volume to be accurate, but does not itself make the MQL system run any faster. Therefore, anticipating the START signal and opening the pressurized lubricant delivery valve early, in accordance with the MQL system and methods described herein, allows the response time to appear to be shorter.

It will be appreciated that anticipating the sending of the START signal may reduce response times (the elapsed time from the START signal to the first appearance of lubricating fluid at the tool tip) in flow-metered MQL systems (i.e., "flow-over-time" MQL systems) as well as in volumetric MQL systems. As described herein, there is a travel time for the lubricant to travel through the tool holder and tool, which is present regardless of the manner in which the lubricant is delivered to the tool holder and tool. A metering valve-equipped MQL system typically has a high-pressure loop on the lubricant supply side of the metering valve, such that the MQL system is less sensitive to lubricant volume changes. However, the metering valve-equipped MQL system will still exhibit pushback of the lubricating liquid because the liquid lubricant pressure in the liquid conduit, on the spindle side of the metering valve, will change between atmospheric pressure and the backpressure level before the metering valve is opened. Furthermore, because the lubricant flow rate is derived from actual measurements of flow over time (i.e., a calculated calibration factor) in flow-metered MQL systems, correlating the liquid pressure on the upstream side of the metering valve to the anticipated or actual backpressure for a given tool may result in improved flow rate accuracy in such flow-metered MQL systems.

As with a volumetric MQL system, in an MQL system that makes use of a metering valve, reducing the response time may be accomplished by anticipating an impending backpressure change, and setting lubricant pressure and the timing of metering valve actuation (in advance of the START signal) accordingly. Knowing the backpressure change in advance allows the response time to be reduced by having the MQL system adjust, before the START signal is sent, either the MQL system pressure, or the rate and duration the metering valve is opened, or both. For example, the MQL system pressure may be adjusted such that a constant differential pressure is present for each anticipated backpressure. With a same pressure differential, the flow rate is the same, allowing a volume to be determined by only varying the switching time of the metering valve. In the alternative, the rate and duration that the metering valve is opened may be changed based upon each pressure differential. However, the adjustment will be simplified if one of the variables (time or rate) is held constant.

In either volumetric or metered MQL systems, system response time may be further improved by anticipating the sending of the START signal and opening a final pressurized lubricant supply valve before the START signal is received. As described above, in both volumetric and metered systems, an increase in air backpressure will force the lubricating liquid backwards up the liquid delivery tube or lubricant conduit. Therefore, anticipating the START signal and opening the final pressurized lubricant supply valve before the START signal is received allows the lubricant to begin flowing in the liquid delivery tube or lubricant conduit (but not necessarily out of the tool) before the START signal is received. This reduces the apparent response time between receiving the START signal and lubricant appearing at the tip of the tool.

FIG. 1 illustrates an exemplary MQL system 100, which is described in detail in the commonly-owned U.S. patent application Ser. No. 15/299,521, corresponding to U.S. Publication No. 2017/0113315 (hereinafter "the '315 publication"), which is hereby incorporated herein by reference in its entirety. MQL system 100 includes an MQL system controller 102, which controls a pneumatic control 140 and a fluid control 160. The fluid control 160 provides a controlled supply of lubricant, such as an oil, to the interface or contact region between the machining tool and a workpiece engaged by the tool. The controller 102 may receive input from a user interface (not shown), such as air supply data, lubricant supply data, or data related to an algorithm such as an air-to-lubricant ratio. The controller 102 may be implemented as a microprocessor-based controller that, using control software, sends and receives one or more electrical signals to and from each of the various working components of the MQL system 100 to affect the control software. Additionally, the controller 102 may also include a memory for storing information, such as control software, input information, data from a user, or other signals received at the controller 102 (such as received from a CNC machine).

As illustrated in FIG. 1, the pneumatic control 140 is provided with a flow of compressed air from an air source 142. Optionally, the air source 142 may be replaced with a different gas source, such as one containing a cryogenic gas, for example $CO_2$. As described in detail in the '315 publication, air provided by the air source 142 is passed through a series of components 144, which may include a variety of valves, filters, air pressure transducers, and air flow meters. As illustrated in FIG. 1, the pneumatic control 140 is used to determine a pressure and volumetric flow rate of a flow of pressurized air from the air source 142, which is then passed to an air supply line 146. As described in the '315 publication, the pneumatic control 140 is thus capable of accurately determining both the pressure and volume of air that is being provided within the MQL system 100.

The fluid control 160 is provided with a supply of lubricant from a liquid supply 162. The fluid control 160 is coupled to a high-pressure liquid line 166. As described in the '315 publication, the supplied liquid is passed through a series of regulating components 164, which may include valves, filters, and flow meters. The supplied liquid is pressurized and provided to the high-pressure liquid line via a flow pump 168. The high-pressure liquid line 166 may be coupled with the air supply line 146, or a lubricating tool, or both, to supply lubricating fluid to a tool. The fluid control 160 is capable of providing a consistent, known, and continuous flow of lubricating fluid during operation or between operations.

The flow pump 168, which may be a continuous flow pump, may be implemented as a stepper motor that converts rotational movement of the motor into linear movement for actuating an actuator which reciprocates a piston disposed within a positive displacement pump. In one exemplary embodiment, the flow pump 168 may be implemented as a dual-action pump, or as multiple single-action pumps. A continuous or near-continuous output of lubricating liquid should be understood as a constant volumetric output of liquid, such as a stream, or a constant output over time only interrupted for a brief instant when the pump piston changes direction or while switching between multiple single action pumps. For purposes of this description, "continuous" means both continuous or near-continuous, only pausing briefly, such as during a change in pump piston stroke direction. A continuous supply of lubricating liquid enables a precise, constant flow of lubricating fluid to the contact region of the tool during a machining operation on a workpiece.

As illustrated in FIG. 1, a communications line 169 couples the sensors and meters of the fluid control 160 to the controller 102. The communications line 169 provides a signal representative of the pressure and volume of liquid from the flow pump 168. Therefore, the MQL system 100 can supply a lubricant to a tool at a precise flow rate through monitoring the liquid flow and making adjustments to that flow.

The supply of lubricant to the tool in the MQL system 100 requires significant pressure to overcome backpressure, which is generated by the supply of air from the pneumatic control 140. The flow pump 168 is therefore required to provide that continuous flow of lubricating liquid despite a large backpressure generated within the lubricant line of the MQL system 100. System backpressure can be up to 10 bar or more, for example.

The pneumatic system 140 controls the airflow through a spindle system or rotating tool assembly 180, while the fluid system 160 controls the flow rate of the lubricating fluid. A rotating union 182 is mounted on a spindle 186, which, in turn, is mounted in the machine-tool system, with a liquid delivery tube 184 positioned axially down the center of the spindle 186 (with an air conduit 185 surrounding the liquid delivery tube 184). As illustrated in FIG. 1, pressurized air and lubricating liquid are delivered separately (i.e., in separate conduits) to the rotating union 182. The rotating union 182 is designed to keep these fluids separate. The supplied air flows within the air or gas conduit 185, which is outside of and surrounds the liquid delivery tube 184, while the lubricating liquid is transferred through the spindle 186 inside of the liquid delivery tube 184. An exemplary tool and tool holder assembly 188 (hereinafter collectively referred to as a "tool") is clamped into the spindle 186 and coupled to the air and lubricating liquid passages such that the air and lubricating liquid are mixed in the tool 188. A resulting MQL lubricant aerosol is developed in a mixing chamber 187 of the tool holder and delivered out the end of the tool 188 during a machining operation.

In one exemplary embodiment, a spindle air vent valve 190 is placed upstream of the spindle 186 to relieve any air pressure in the spindle 186 prior to removal of the tool 188. The spindle air vent valve 190 maintains the system air pressure upstream of the spindle system 180 in order to permit removal or change of the tool 188 without needing to depressurize or re-pressurize the entire MQL system 100.

To negate the effects of system elasticity, described above, a lubricant pressure maintenance valve 192 is provided upstream of and near the rotating union 182 to allow the fluid system to be held under pressure prior to, during, and after operation. The lubricant pressure maintenance valve 192 eliminates the need for re-pressurizing the lubricant when a START signal is received from the CNC machine. The lubricant pressure maintenance valve 192 maintains the lubricant pressure upstream of the spindle 180 when the lubricating liquid delivery is stopped, and reduces undesirable effects of compression and expansion in the liquid delivery system.

As discussed in detail in the '315 publication, the inputs received by the controller 102 may be used in the operation of the MQL system 100 with respect to the tool 188. For example, these input(s) may be used to develop an algorithm for providing a supply of air and a supply of lubricant, or a mixture thereof, to the tool 188. Measurements made by the air fluid sensors 144, 164 may be used to provide signals to the controller 102 to operate the air and lubricant supplies, such as via the valves 144, 164, or the flow pump 168, to accurately provide a desired mixture of lubricant and air to the tool 188 at a desired pressure and volume.

Figure 2:
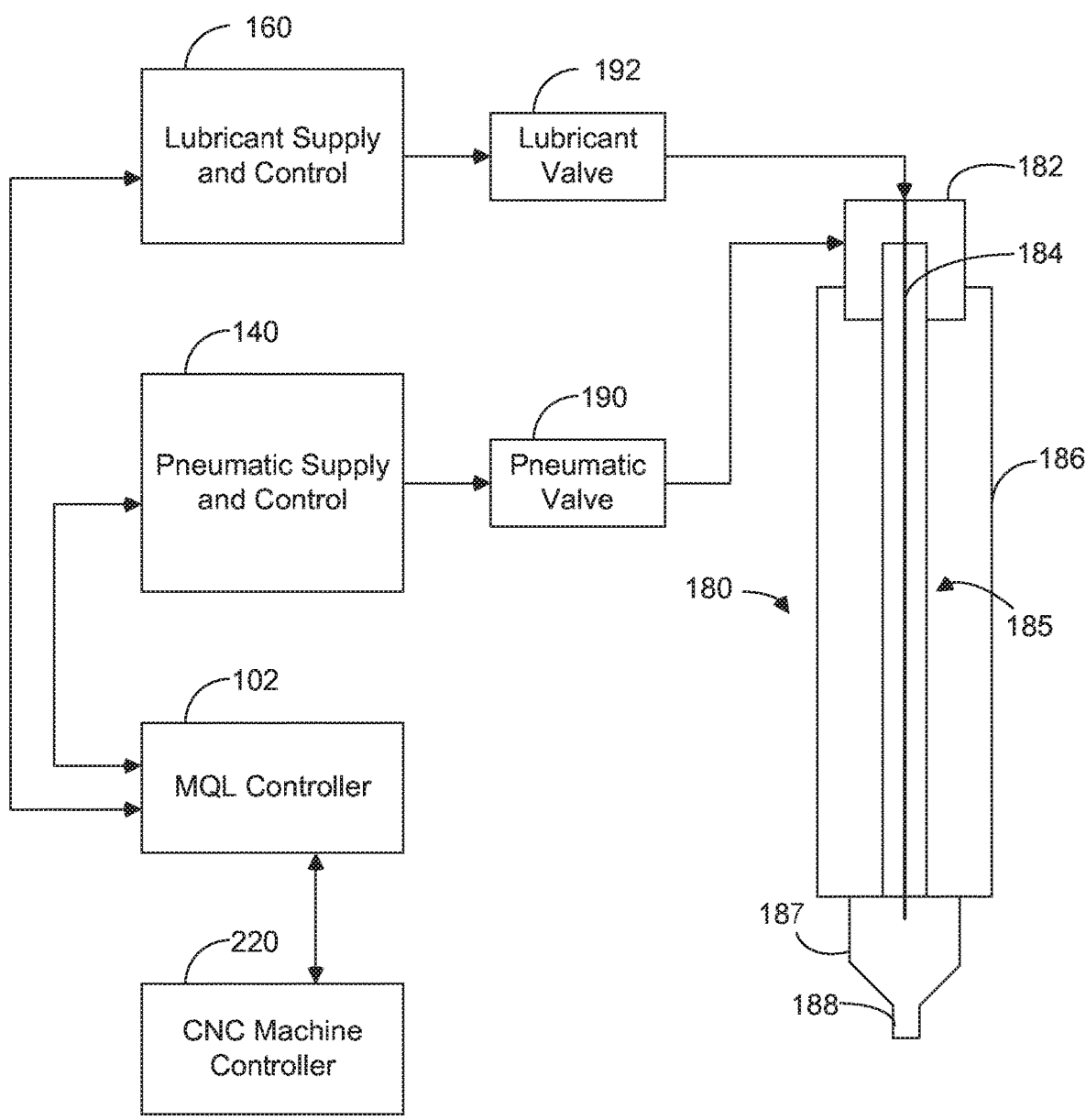
FIG. 2 is a block diagram of an exemplary MQL system coupled to a tool according to an embodiment of the present invention.

FIG. 2 illustrates a simplified block diagram of the MQL system 100 illustrated in FIG. 1. For the sake of clarity, the control valves, sensors, and actuators (164, 144) are omitted from FIG. 2, except for the spindle air vent valve (the "pneumatic valve") 190, and the lubricant pressure maintenance valve (the "lubricant valve") 192. As also illustrated in FIG. 2, the MQL controller 102 is also communicatively coupled to a CNC machine controller 220. The CNC machine controller 220 is configured to control the operation of the tool 188 and is also configured to send START and STOP signals to the MQL controller 102 for the control of lubricant delivery.

The anticipation or advanced knowledge of backpressure in the MQL system may be provided to the fluid control 160 when the CNC machine provides an indication that a tool change is in progress. Alternatively, an optical or RFID tag on a tool holder may be used. Optionally, a pressure signature for an overall machining cycle of a particular operation can be learned and used by the MQL system to anticipate the system pressure changes. As discussed herein, when a machining operation comprises a series of machining steps that include one or more tool changes, the backpressure requirements or characteristics for the MQL system may change with the different tools. These tool changes, and the resultant backpressure changes, once selected for the machining operation, may be used to create a pressure signature of the changing backpressure requirements of the machining operation to program the MQL system for the machining operation. Such a pressure signature may comprise a timeline or time table of anticipated backpressure requirements for the particular machining operation.

As described above, the response time may be further reduced by more rapidly overcoming any backpressure-induced pushback of lubricant in the liquid delivery tube 184 or the lubricant conduit when the START signal is received. This backpressure-induced pushback can be more rapidly overcome by anticipating the sending of the START signal (by the CNC machine controller 220) and opening the pressure maintaining valve 192 before receiving the START signal. The START signal may be anticipated by an exemplary CNC machine controller 220 sending a separate signal that indicates the START signal is about to be sent. Alternatively, the MQL system controller 102 could have pre-established "signatures" or "profiles" of the different CNC machine processes, with each signature or profile defined by the particular operations of the different machining processes. Such a signature/profile may comprise one or more periods of time during a machining process that includes periods of time when lubricant is requested with the START signal. Thus, the overall timing of the particular machining operation may be used to anticipate when the START signal is about to be sent. Such an operational signature may comprise a timeline or time table of anticipated START signals for the particular machining operation. Optionally, the operational signature may also include anticipated STOP signals in the timeline/time table such that anticipated START and STOP signals are anticipated.

An exemplary machining operation may comprise one or more iterations of a series of movements and machining steps (cutting, drilling, etc.) that include periods when the MQL system will be stopped and other periods when the MQL system will be expected to deliver lubricant over any number of time intervals. For example, a simple machining operation may include a series of cutting and/or drilling operations with a pause between each cutting/drilling operation to allow the tool to be transferred to a new location. Tool changes may also be included in the machining operation. When provided with the operational signature of this machining operation (e.g., a selected series of cutting/drilling operations with selected time intervals between each cutting/drilling operation), a timeline or time table of the time periods of when lubricant will be demanded in the signature/profile for this particular machining operation may be anticipated, such that the receipt of each START signal during the machining operation may be anticipated by a selected period of time.

Optionally, in order to prevent the MQL system 100 from continuing the flow of lubricant when no anticipated START signal is forthcoming, the MQL controller 102 is further configured to start a counter or timer upon opening the liquid maintaining valve 192 in anticipation of the START signal. When the counter or timer reaches a predetermined time interval (e.g., between 0.5-2.0 seconds) and the START signal has not been received, the MQL controller will close the liquid maintaining valve 192. Such a timer may be used to shut down the flow of lubricant if the START signal is incorrectly anticipated or if there was some unexpected reason that the START signal was not received.

Figure 3:
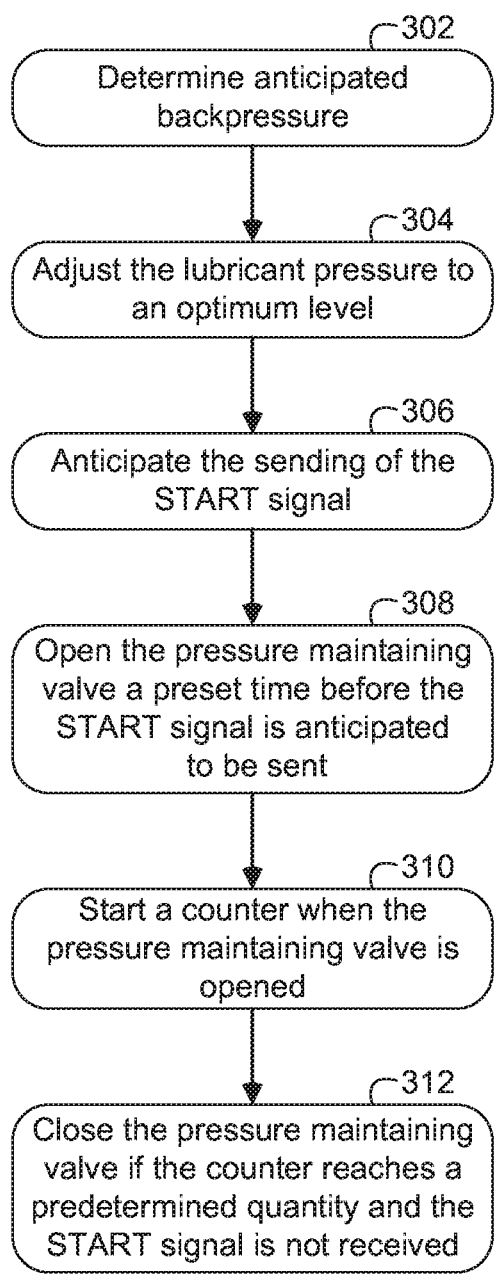
FIG. 3 is a flow diagram illustrating a method for operating an MQL system according to an embodiment of the present invention.

FIG. 3 illustrates the steps to an exemplary method for reducing response time in an MQL delivery system. As illustrated in step 302, an anticipated backpressure is determined based on one or more factors such as the mounted tool, the machining operation to be conducted by the tool, or a profile of the upcoming machining operation or cycle. If the current tool 188 is still being used in the same or similar operation, it is anticipated that the backpressure will return to the previous pressure level. However, if a different tool 188 is to be used, or the same tool in a different operation, an anticipated backpressure that will be experienced may be different from the previous pressure level. This change in backpressure may be used to determine a new or updated optimum pressure level (for a given lubricant flow rate) for the lubricant control system 160. Therefore, in step 304, with this advanced knowledge of the pending backpressure, the MQL system adjusts the lubricant line pressure at the pressure maintaining valve 192 to an updated optimum level that prepares the MQL system pressure to overcome the anticipated backpressure and delivery lubricant at the desired flow rate.

In step 306, the sending of the START signal is anticipated. Anticipating the START signal may be achieved by receiving another signal from the CNC machine controller 220. This other signal may be sent a predetermined duration of time before the START signal. For example, the CNC machine controller 220 may generate a rotation signal to begin rotating the tool, and the rotation signal may be used by the MQL controller 102 to anticipate the START signal that is expected to be generated by the CNC machine controller 220 a known elapsed time following the rotation signal. Alternatively, as described above, the MQL controller 102 may contain pre-established "signatures" or "profiles" of the different CNC machine processes, with each signature/profile defined once a set sequence of machining steps has been selected for the respective machining operations, such that the selected machining steps (and their associated cutting/drilling operations) and their associated timelines/time tables of time intervals (of START signals) are used to anticipate when the START signal for the particular machining operation is about to be sent by the CNC machine controller 220.

In step 308, with the sending of the START signal anticipated, the MQL controller 102 commands the lubricant pressure maintaining valve 192 to open at a predetermined duration of time before the next START signal is anticipated to be sent. Therefore, with the lubricant pressure already preset in response to the anticipated backpressure, the pressurized lubricant can start moving down the liquid delivery tube 184 and be ready at the tool 188 even before the START signal is received by the MQL controller 102.

In step 310, an optional counter or timer of the MQL controller 102 is started when the MQL controller 102 opens the lubricant pressure maintaining valve 192 in anticipation of the START signal, in order to shut down the flow of lubricant at the tool 188 if the START signal is not forthcoming. Finally, in step 312, the MQL controller 102 closes the lubricant pressure maintaining valve 192 if the counter or timer reaches a predetermined duration of time and the START signal has not been received. In this manner, the flow of lubricant will be halted at the tool 188 if the START signal is incorrectly anticipated or there was some unexpected reason that the START signal was not received.

Thus, an MQL system and associated methods are provided for supplying a lubricant to a CNC machine and an attached tool, with reduced response times when lubricant delivery is requested from the CNC machine's control unit. The exemplary MQL systems and methods provide for reduced response times by compensating for changing backpressure according to the specific tool selected and how used for a particular machining operation, as well as by more rapidly overcoming physical pushback of the lubricant by gas pressure by anticipating the sending of the START signal and starting the lubricant delivery process early. Thus, by anticipating the START signal, the time spent moving the liquid back to the discharge end of the lubricant conduit may be substantially or entirely expended before the START signal is sent.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. Therefore, it will be appreciated that changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A minimum quantity lubrication (MQL) system comprising:
    a lubricant module configured to be coupled to a machining spindle and operable to supply lubricant at a preset flow rate to a tool coupled to the spindle;
    a pneumatic module configured to be coupled to the spindle and configured to supply pressurized air to the tool; and
    a controller operable to control the operation of both the lubricant module and the pneumatic module, wherein the controller is microprocessor-based;
    wherein the controller is configured to receive a start signal and a second signal from a machine tool controller, wherein the second signal is a control signal for the machining spindle and is output a predetermined duration before the start signal, wherein the controller, in response to receiving the second signal, is operable to direct the lubricant module to supply the lubricant to the tool prior to receiving the start signal from the machine tool controller after previously receiving a stop signal from the machine tool controller, wherein the stop signal is a command for the MQL system to not supply lubricant to the tool, and wherein the start signal is a command for the MQL system to supply lubricant to the tool, and wherein the controller is configured to direct the lubricant module to stop the supply of lubricant to the tool when a subsequent stop signal is received.

2. The MQL system of claim 1, wherein the controller is configured to select a lubricant pressure level for the lubricant module before receiving the start signal, wherein the selected lubricant pressure level corresponds to a known backpressure parameter associated with the tool coupled to the spindle.

3. The MQL system of claim 1, wherein the controller is configured to receive from the machine tool controller an identity of any one of a plurality of tools that are configured for coupling to the spindle, when the one of the plurality of tools is coupled to the spindle, and wherein the machine tool controller is configured to determine the identity of the one of plurality of tools as defined by an associated optical or RFID tag.

4. The MQL system of claim 1, comprising a valve between the lubricant module and the tool, wherein the controller is configured to open the valve before the start signal is received.

5. The MQL system of claim 4, wherein the controller is configured to start a timer to determine an elapsed time after the valve is opened, and to close the valve if the elapsed time exceeds a predetermined time interval during which the start signal has not been received by the controller.

6. The MQL system of claim 1, wherein the lubricant module is configured as one of a volumetric system and a flow metered system.

7. A method for reducing a response time of a minimum quantity lubrication (MQL) system for use with a computer numerical control (CNC) machine comprising a tool coupled to and in fluid communication with a spindle, the MQL system including a lubricant module in fluid communication with the spindle, a pneumatic module in fluid communication with the spindle, and a controller for controlling the operation of the lubricant module and the pneumatic module, wherein the controller is microprocessor-based, and wherein the method comprises:

waiting for a start signal and a second signal from the CNC machine, wherein the second signal is received a predetermined duration before the start signal;

in response to receiving the second signal after having previously received a stop signal, directing the MQL system to supply atomized lubricant to the tool before receiving the start signal, wherein the atomized lubricant is supplied by:

supplying, with the pneumatic module, pressurized gas to the tool; and supplying, with the lubricant module, lubricant to the spindle or to the tool;

after supplying the lubricant at a selected flow rate to the spindle or the tool, as directed by the controller, receiving, with the controller, the start signal from a machine tool controller, wherein the start signal is a command for the MQL system to supply atomized lubricant to the spindle or to the tool, and wherein the stop signal is a command for the MQL system to not supply lubricant to the tool; and directing the MQL system to stop the supply of atomized lubricant to the tool when a subsequent stop signal is received.

8. The method of claim 7, further comprising selecting a lubricant pressure level for the lubricant module before receiving the start signal, wherein the lubricant pressure level is selected according to the tool coupled to the spindle.

9. The method of claim 8, wherein the CNC machine comprises a plurality of tools, each configured for coupling to the spindle, wherein the method further comprises determining a tool identity for the tool that is coupled to the spindle out of the plurality of tools, wherein the tool identity is used by the controller to determine the lubricant pressure level.

10. The method of claim 7, wherein the MQL system further comprises a valve between the lubricant module and the tool, and wherein the supplying the lubricant to the spindle or tool comprises opening the valve before the start signal is received.

11. The method of claim 10, further comprising:

commanding the valve to open a predetermined duration of time before the start signal is received;

starting a timer when the valve is opened; and closing the valve if the timer signals that the predetermined duration of time has elapsed and the start signal has not been received.

12. The method of claim 7, wherein the lubricant module is configured as one of a volumetric system and a flow metered system.

* * * * *